US011451112B2

(12) United States Patent
Kim et al.

(10) Patent No.: US 11,451,112 B2
(45) Date of Patent: Sep. 20, 2022

(54) FLYWHEEL AND MOLTEN SALT HYBRID ENERGY STORAGE SYSTEMS (71) Applicant: Higher Dimension Materials, Inc., St. Paul, MN (US)

(72) Inventors: Young-Hwa Kim, Hudson, WI (US); Richard Dale Olmsted, St. Paul, MN (US)

(73) Assignee: Higher Dimension Materials, Inc., St. Paul, MN (US)

( * ) Notice: Subject to any disclaimer, the term of this patent is extended or adjusted under 35 U.S.C. 154(b) by 0 days.

(21) Appl. No.: 17/530,219

(22) Filed: Nov. 18, 2021

(65) Prior Publication Data

US 2022/0166287 A1 May 26, 2022

Related U.S. Application Data (60) Provisional application No. 63/118,393, filed on Nov. 25, 2020.

(51) Int. Cl.
*H02K 7/02* (2006.01)
*H02K 7/18* (2006.01)
*H02J 15/00* (2006.01)

(52) U.S. Cl.
CPC ............ *H02K 7/025* (2013.01); *H02J 15/007* (2020.01); *H02K 7/183* (2013.01)

(58) Field of Classification Search
CPC ........ H02K 7/025; H02K 7/183; H02J 15/007
See application file for complete search history.

(56) References Cited

U.S. PATENT DOCUMENTS

| 2006/0059937 | A1* | 3/2006 | Perkins | F02C 7/18 |
| | | | | 62/401 |
| 2011/0114406 | A1 | 5/2011 | Gibson et al. | |
| 2011/0263384 | A1 | 10/2011 | Drazan | |
| 2014/0093757 | A1 | 4/2014 | Sakai et al. | |
| 2015/0167489 | A1* | 6/2015 | Heiligenstein | H02J 3/28 |
| | | | | 290/52 |
| 2015/0308410 | A1 | 10/2015 | Goldstein | |
| 2017/0201113 | A1* | 7/2017 | Gazit | H02J 7/0013 |

FOREIGN PATENT DOCUMENTS

WO    WO-2020244809 A1 * 12/2020    ............. F25J 1/0012

OTHER PUBLICATIONS

International Search Report and Written Opinion in International Appln. No. PCT/US2021/059871, dated Feb. 9, 2022, 11 pages.

* cited by examiner

*Primary Examiner* — Joseph Ortega
(74) *Attorney, Agent, or Firm* — Fish & Richardson P.C.

(57) ABSTRACT

This disclosure describes novel hybrid energy storage systems for providing short-term and long-term storage and delivery of electricity generated by any energy source including renewable energy sources such as solar energy and wind energy. The hybrid energy storage systems described herein have a higher overall real-world efficiency than energy storage systems currently available.

21 Claims, 3 Drawing Sheets

FLYWHEEL AND MOLTEN SALT HYBRID ENERGY STORAGE SYSTEMS

CROSS-REFERENCE TO RELATED APPLICATIONS

This application claims the benefit of U.S. Provisional Application Ser. No. 63/118,393, filed Nov. 25, 2020. The disclosure of the prior application is considered part of (and is incorporated by reference in) the disclosure of this application.

BACKGROUND

1. Technical Field

This disclosure relates to novel energy storage systems for long-term storage of electricity generated by any energy source including renewable energy sources such as solar energy and wind energy.

2. Background Information

Rapid growth of renewable energy sources such as solar energy and wind energy is a powerful driving force for cost effective and long-term storage of large amount of renewable energy. There are varieties of different energy storage systems (ESS) readily available in the markets. Major forms of ESS in the markets are Battery Energy Storage Systems, Flywheel Energy Storage Systems (FESS), Molten Salt Energy Storage Systems (MSESS), and Compressed Air Energy Storage (CAES). Each of these energy storage systems have characteristic advantages and disadvantages. However, as this disclosure shows, a novel integration of such storage systems solves problems that are not solved by such stand-alone systems.

SUMMARY

This disclosure describes novel ways of integrating FESS and MSESS into an integrated flywheel and molten-salt hybrid energy storage system (hereinafter referred to as "YKESS"). The YKESS synergistically enhances the advantages of FESS and MSESS technologies, as described further below. YKESS is a novel integration of FESS and MSESS that enhances the strengths of FESS and MSESS and eliminates or minimizes the weaknesses of FESS and MSESS. For convenience, end users of electricity and network grids of electrical power will be referred to hereinafter as "users."

In one aspect, this disclosure is directed to an energy storage and delivery system that includes one or more FESS and a MSESS. The one or more FESS are configured to generate and deliver electricity to users. The MSESS includes a container holding salt therein; a heater in thermal contact with the salt; a heat exchanger in thermal contact with the salt; a turbine fluidly coupled to an output of the heat exchanger; an electricity generator mechanically coupled to the turbine, wherein electricity output by the electricity generator is delivered to power flywheel rotations of the one or more FESS; and a compressor or pump fluidly coupled to an input of the heat exchanger, wherein the compressor or pump is powered by energy output by the one or more FESS.

Such a system may optionally include one or more of the following features. The heater may be configured to be electrically powered by electricity generated by solar panels or wind turbines. The system may also include the solar panels or the wind turbines. The system may be configured to send at least a first portion of the electricity generated by the solar panels or the wind turbines to users without powering the one or more FESS. The system may be configured to send at least a second portion the electricity generated by the solar panels or the wind turbines to the one or more FESS to power flywheel rotations of the one or more FESS. The heater may be configured to transfer heat to the salt. The heat exchanger may be configured to transfer heat from the salt to a fluid passing through the heat exchanger as the fluid flows toward the turbine. The system may also include a fluid storage tank positioned fluidly between an output of the turbine and an input of the compressor or pump. In some embodiments, the fluid storage tank is underground. In some embodiments, excess electricity from a renewable energy source is distributed to the one or more FESS and the MSESS system such that energy stored in the MSESS is at least two times greater than energy stored in the one or more FESS. The MSESS may also be configured to deliver energy to power the compressor or pump. The system may be configured to automatically switch the energy to power the compressor or pump from being delivered by the one or more FESS to being delivered by the MSESS in response to the energy contained by the one or more FESS reaching a lower limit. The electricity output by the electricity generator may also be delivered to the users. In some embodiments, each FESS of the one or more FESS stores 10 kWh or less of kinetic energy. Each FESS of the one or more FESS may weigh less than 1,000 kg. The one or more FESS comprises at least four FESS.

In another aspect, this disclosure is directed to an energy storage system for use during interruptions of electricity from a renewable energy source. The system includes a FESS for short-time delivery of electricity to users and an MSESS for long-time delivery of electricity to the users.

Such a system may optionally include one or more of the following features. The MSESS may include an air compressor, and the FESS may be configured to deliver energy to power the air compressor. In some embodiments, the MSESS is also configured to deliver energy to power the air compressor. The energy storage system may be configured to automatically switch the energy to power the air compressor from being delivered by the FESS to being delivered by the MSESS in response to the energy contained by the FES system reaching a lower limit.

In another aspect, this disclosure is directed to a method of delivering electricity to users. The method includes: (i) delivering a first portion of electricity generated from a renewable energy source to the users; (ii) delivering a second portion of electricity generated from the renewable energy source to one or more FESS; and (iii) delivering a third portion of electricity generated from the renewable energy source to a MSESS.

Such a method may optionally include one or more of the following features. The additional electricity may be delivered to the one or more FESS in response to a kinetic energy level of the one or more FESS being below a pre-determined lower threshold value. The method may also include powering, by energy delivered from the one or more FESS, a pump or compressor of the MSESS. The method may also include, in response to a demand for the electricity from the users being greater than the first portion of electricity generated from the renewable energy source, delivering additional electricity to the users, wherein the additional electricity is generated by the one or more FESS. The method may also include, in response to a demand for the electricity from the users being greater than the first portion of electricity generated from the renewable energy source, delivering additional electricity to the users, wherein the additional electricity is generated by the MSESS.

There are at least five major objectives and advantages that the YKESS described herein provides. The first objective and advantage is long-term and low-cost storage of renewable energy harvested from solar panels, wind turbines, and/or other forms of renewable energy devices. In this context, "long-term" means many days or many weeks of time. "Low-cost" means an initial capital cost of storage per kilowatt-hour that is significantly lower than cost of storage per kilowatt-hour by modern, commercially available FESS.

The second objective and advantage is that the YKESS described herein can use one or many low-cost, maintenance-free, and small-sized FESS e.g., with an energy storage capacity of about 10 kWh (kilowatt-hour).

Third, the YKESS described herein can provide essentially instant delivery of sufficient electric power to energy users to meet the widely and frequently fluctuating demand of electricity from the users.

Fourth, the YKESS described herein has the capability of sending sufficient electric power to one or many users continuously for one week or longer.

Fifth, the YKESS described herein can provide large-scale energy storage of renewable energy without using environmentally and biologically harmful materials. In addition, the YKESS only occupies a small area of land.

The YKESS described herein can be an indispensable source of energy for large data centers, large manufacturing plants, big hospitals, and the like. Moreover, the YKESS can provide a backup of the power grid (e.g., for large cities) in case an existing supply of electricity is disrupted by a brownout, or for a long period.

The YKESS described herein can also reduce the heavy dependence of power-hungry societies on energy generated by burning fossil fuels.

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. Other features, objects, and advantages of the invention will be apparent from the description and drawings, and from the claims.

DETAILED DESCRIPTION

This disclosure describes new and novel systems that integrate FESS and MSESS into a single energy storage system that is referred to herein as the YKESS. The integrated/hybrid energy storage systems described herein (YKESS) enhance the individual advantages of FESS and MSESS and avoid the individual disadvantages of FESS and MSESS. In some cases, the YKESS described herein can provide a steady and uninterrupted supply of electricity to users for more than one week of time.

The Earth receives energy from the Sun that is more than 10,000 times the energy that all humans on the Earth consume. Wind energy is a derivative of the energy from the Sun. Yet, energy-hungry societies depend mostly on energy from burning fossil fuels. There is strong international pressure to reduce the consumption of fossil fuels and to switch to renewable energy sources such as solar or wind power.

The cost of renewable energy is now roughly equal to or lower than the cost of energy generated by fossil fuels. However, a serious problem of renewable energy is that electricity generated by solar panels and wind turbines cannot be stored economically for long period of time. The serious problem of renewable energy boils down to the problem of long-term economic methods of storing large amounts of the energy from the Sun. It is the problem of long-term economic storage of the energy from the Sun.

The capacity utilization factor (CUF) of renewable energy is low, averaging only about 17% to 20%. This is mainly due to day-and-night cycles and frequently changing weather. A typical solar power plant having a nominal capacity of 1 megawatt (1 MW) can generate about 990 kilowatts (99% of 1 MW) of electricity at a peak time (e.g., around noon on a clear sunny day for solar panels). However, a few hours around noon are not the best time for maximum user consumption of the electricity generated by solar power plants. Sometimes, renewable energy is not available for many days when foul weather or windless conditions continue that long.

In the YKESS described herein, the strengths of FESS and MSESS are synergistically enhanced and weaknesses of FESS and MSESS are eliminated or minimized by novel integrations of FESS and MSESS. When applied widely in large scales, the YKESS described herein will eliminate or drastically reduce the dependence of energy-hungry societies on environmentally destructive and unhealthy burning of fossil fuels.

The YKESS described herein include novel integrations of two existing well-proven energy storage systems, namely, Flywheel Energy Storage Systems (FESS) and Molten Salt Energy Storage Systems (MSESS). The two technologies of FESS and MSESS are entirely different from each other. Designers and developers of FESS and MSESS have never worked together to achieve synergistic integration of the two energy storage systems. Therefore, no one in these two areas of energy storage systems technologies has uncovered incredible benefits of a novel and counter-intuitive integration of FESS and MSESS as described in this disclosure. FESS and MSESS have characteristic strengths and weaknesses as two separate stand-alone storage systems of renewable energy.

One of the inventive concepts of the YKESS described in this disclosure can be succinctly described as follows. The YKESS described herein integrates one or more low-cost FESS which stores only a relatively small amount of energy and a MSESS that stores a large amount of energy as low-cost heat energy of molten salt in such a way that the MSESS becomes a large reservoir of energy and supplier of the energy to the FESS, when needed, and the FESS becomes a fast-responding provider of a large amount of electric power to users and power grids almost instantaneously in response to unpredictable and widely fluctuating needs of electricity during many days of foul weather for solar panels or windless weather for wind turbines. Strengths and weaknesses of FESS and MSESS as two separate stand-alone systems, and novel integrations of FESS and MSESS are described in the following sections.

Strengths and Weaknesses of Flywheel Energy Storage Systems (FESS)

A FESS can quickly generate and send electricity almost instantaneously to users when normal electric power is interrupted. The efficiency of modern FESS is high (e.g., in the range of 88% to 98%). A modern commercially available FESS is highly reliable and durable. It is virtually maintenance free for many years. Its service life is more than 20 years. However, the energy storage capacity of a FESS is rather limited. The capacity of energy storage of FESS increases as the square of the angular speed of its flywheel. For example, if the angular speed of a flywheel increases twice, the corresponding energy of the flywheel increases four times. Therefore, a designer of FESS tries to maximize angular speed of flywheel of a FESS. As of now, typical angular speeds of commercially viable FESSs are in the range of 5,000 rpm to 18,000 rpm (revolution per minute). When the angular speed of a flywheel of a FESS becomes significantly greater than 18,000 rpm, the cost of making the FESS and operation cost of the FESS becomes prohibitively expensive due to many difficult technical problems associated with a flywheel that rotates at such a high angular speed. A commercially available FESS that runs at an angular speed of 10,000 rpm can store only 32 kWh (kilowatt-hour). FESS is too expensive to store enough energy for long-term (more than one day) continuous delivery of a reasonable amount of electric power to users.

A fast-rotating flywheel is dynamically unstable. A fast-rotating flywheel is subject to gyroscopic precession and wobbling due to the rotation of the Earth and other minor causes. The gyroscopic precession and wobbling of the fast-rotating flywheel must be vigorously controlled (or suppressed) since the flywheel rotates at such a high angular speed in a tightly confined space of a vacuum chamber. Any failure of control of the dynamics of the fast-rotating flywheel will result in a catastrophic accident or destruction. A fast-rotating flywheel becomes 'stiff' in the sense that a change of direction of the flywheel's axis of rotation requires a stronger torque when the angular speed increases. Varieties of permanent magnets and electromagnets (magnets powered by electricity) and sophisticated electronic control systems are used to control (or regulate) gyroscopic precession and wobbling of the fast-rotation flywheel in a FESS. These electromagnetic control systems consume a lot of energy.

The total energy that can be stored by a FESS is proportional to the square of its flywheel's angular speed. However, increasing the angular speed beyond about 20,000 rpm becomes extremely technically difficult and extremely expensive to operate. This is a fundamental limit of FESS technology. There are R&D teams who try to make a FESS that runs at 100,000 rpm and even higher. However, a FESS that runs at such a high angular speed is not technically and economically feasible for commercial ESS applications in foreseeable future. On the other hand, a commercially viable FESS that runs at a technologically feasible angular speed in the range of 5,000 rpm to 18,000 rpm has a rather limited total energy storage capacity.

One strength of FESS is that it can release its kinetic energy into large amounts of electric energy in a very short time to users (e.g., within about one second) when a fast release of a large amount of electricity is needed by users. A FESS that operates at a modest angular speed in the range of 5,000 rpm to 10,000 rpm is highly durable and almost maintenance free. Its service life is over 20 years.

Although the energy release time of a FESS is excellent, the total amount of energy a given FESS can deliver is quite limited. For instance, a commercially available FESS stores about 32 kWh and can release that energy at a rate of 8 kW. The total time that the FESS can supply energy is, therefore, only about 4 hours. For a multi-megawatt grid application, such a power boost is excellent for smoothing out power supply. However, the response to an electricity brownout (say, 10% drop in power in some regions) requires many units of FESS that are connected to a large MSESS, as described herein.

Strengths and Weaknesses of Molten Salt Energy Storage Systems (MSESS)

MSESS is a well-proven technology for large scale and low-cost storage of renewable energy. Salt is abundantly available, and its price is low. Its heat capacity is large for the storage of a large amount of energy per unit weight. It is not harmful to humans or to fauna or flora of ecosystems.

A molten salt heat reservoir has a high storage efficiency (e.g., above 90%). However, the efficiency of energy transformation from the heat energy of molten salt to electricity is lower than 50%. On the other hand, the cost of energy storage is about $30/kWh. In comparison, the cost of energy storage in a FESS is about $300/kWh and is trending downward.

The cost of Lithium-ion batteries has decreased dramatically, to about $137/kWh (about 5 times the cost of MSESS), but there are other serious issues. Lithium-ion batteries are plagued with high temperature dependence that can limit their practicality in cold climates and cause them to overheat in warm weather; they have a limited lifetime that can be substantially less than 10 years; their use does not scale well in actual plant installations; and lithium-ion batteries depend on rare materials, the mining and disposal of which causes major ecological damage. The fact that lithium-ion batteries may need to be totally replaced several times in the lifetime of a FESS, or of a MSESS, is actually a multiple capital cost that may make long-term dependence on lithium-ion batteries for ESS unsuitable. In addition to repeated capital cost, there is inordinate, additional ecological damage. Accordingly, MSESS clearly shows advantages compared to lithium-ion batteries for long term energy storage.

A major weakness of MSESS is that its response time is slow. The response time of a MSESS is defined as a characteristic time of a MSESS to transit from its idle state to its operational state. In the idle state, the MSESS does not generate electricity. In the operational state, the MSESS generates maximum electricity. A MSESS cannot quickly be jumpstarted to be in its operational state from its idle state by itself. External power is needed to quickly jumpstart the compressor and pump system of an idle MSESS. The jumpstart of a MSESS involves fluid compression, movement of a working fluid (e.g., steam or air) to a heat exchanger, and the slow process of heat exchange between the working fluid and molten salt. For these reasons, the response time of a MSESS is in the range of 5 minutes to 20 minutes. The response time of very large MSESS is in range of a few hours. In addition, the efficiency of MSESS decreases from is its normal efficiency when its generation of electricity changes in time. Therefore, a stand-alone MSESS cannot deliver electricity fast enough to users when fast delivery of a large amount of electricity is needed by users. This is a major weakness of MSESS.

There are variations of MSESS systems (e.g., CAES—Compressed Air Energy Storage) that improve the start-up times by using compressed air instead of water, but they have their own major problems. For example, to generate electricity by using only air instead of water one needs to use huge volumes of air that need to be stored in huge underground caverns under extreme pressure. There are relatively few geographical areas able to accommodate such installations. In addition, one loses the huge expansion associated with the vaporization of water into steam and the latent heat effects of the huge heat of vaporization effects of water. To maintain short response times, such units must be operated in a steady spinning state that uses energy 100% of the time just to be ready. That drastically reduces the overall efficiency of CAES.

The molten salt of a large MSESS can include thousands of tons of salt and occupies a large volume of space. Its 'engine' part, namely, compressor, pumps, turbine, and generator of electricity require frequent repairs and regular maintenance services. Dry air is the preferred working fluid for the MSESS, although water-steam would be a better working fluid for very large scale MSESS. The response time of MSESS with dry air is significantly shorter than the response time of heavy-duty large scale MSESS with water-steam.

Synergistic Integrations of FESS and MSESS (YKESS)

The YKESS described herein are synergistic, hybrid integrations of FESS and MSESS that dramatically enhance the individual strengths of FESS and MSESS, and eliminate or minimize the individual weaknesses of FESS and MSESS. The YKESS inventions described herein are new types of economically-viable energy storage systems for the purpose of long-term energy storage (e.g., storage of large amounts of energy from renewable energy sources). The YKESS provide almost instant and non-interrupting delivery of electricity to users for many days or many weeks when renewable energy cannot be harvested from the sun and/or wind due to day-and-night cycles and/or many days or weeks of unfavorable weather conditions.

The FESS, as a part of the YKESS, functions to provide instantaneous delivery of large amounts of electricity to users. The MSESS, as a part of the YKESS, functions to provide low-cost storage of large amounts of renewable energy in the form of heat (of molten salt), to convert the heat into electricity, and to send the electricity to the FESS when energy stored in the FESS becomes depleted below a certain lower threshold level, and/or to send electricity from the MSESS to the users.

Since the energy of the YKESS is mostly stored in the molten salt of the MSESS, the FESS of the YKESS only needs to store a small amount of energy. For instance, if a stand-alone FESS can store 32 kWh and can instantly deliver 8 kW to users for 4 hours, a counterpart FESS in the YKESS may store a small fraction of 32 kWh and can still deliver 8 kW of immediately available power for much longer than 4 hours, since its energy will be frequently or continuously replenished by electricity generated by the MSESS. Once the MSESS system is fully up to speed and is operating at 100% of its power capacity, the majority of the power from the MSESS can bypass the FESS and supply the users directly. The FESS may then be used to smooth the power supply to eliminate fluctuations in power for which the MSESS is not suitable because of its dwell times.

Using the YKESS, brownouts may be eliminated for large data centers, large manufacturing plants, large hospitals, and the like. For example, if the YKESS adopts the same commercial FESS having a storage capacity of 32 kWh, it can deliver a power of 32 kW for 1 hour, or 64 kWh for 30 minutes. Therefore, the YKESS can deliver a large amount of rapidly changing electric power to its users for long period of time (e.g., as long as 30% of heat energy stored in molten salt of MSESS is not completely depleted). This means that YKESS can meet the needs for an instant large electric power of large hospitals, large data centers, etc., in the case of abrupt interruption of normal electric powers to such institutions. At present, most of such institutions use diesel-burning electric generators as their fast backup of electricity. YKESS can replace these air-polluting diesel generators in case major portions of energy of these organizations are renewable energy already.

This feature of the YKESS has far-reaching positive impacts in FESS industry. When the energy of the FESS is frequently or continuously replenished by its accompanying MSESS that can carry much a larger amount of energy in its molten salt, the amount of energy the FESS may store is only a small amount of energy while it can supply electricity to users for long time as long as the energy of the MSESS is not completely depleted.

The cost of energy storage in a large stand-alone FESS is much more expensive than cost of energy storage in a MSESS. That is a major weakness of FESS. A strength of FESS is that it can reliably deliver large of amount electric power to users almost instantaneously in response to abrupt changes of electricity its users' needs. The low cost of energy storage of the MSESS is its major strength. The YKESS described herein are a synergistic integration of FESS and MSESS for maximum exploitation of the strengths of FESS and the strengths of MSESS. The bottom line of the YKESS described herein is that one can use much smaller and much cheaper (in price, not in its quality) FESS to provide instant and time-varying supply of large amounts of electric power to users for very long times.

The YKESS described herein power the compressor and pump of the MSESS (e.g., to compress air and push compressed air into heat exchangers that are immersed in the molten salt) by electricity generated by the FESS. Electric power that is generated by the MSESS and sent to the FESS varies because the demand of electricity from users is time varying. For this reason, the over-all efficiency of YKESS as an integrated system of the FESS and the MSESS is better when the compressor and pump of the MSESS is powered by electricity from the FESS to eliminate the dwell and synchronization times associated with MSESS alone.

The benefits of the YKESS described herein can be shown in the following actual example of the synergistic effects of combining FESS and MSESS (with computations pertaining to a realistic case) as follows.

An example commercially available FESS has the following specs: Maximum energy storage is 32 kWh, angular speed of its flywheel is 10,000 rpm, its weight is 5,000 kg (5 tons) and its housing dimension 132 cm×137 cm (height× width). The 5-ton FESS can deliver 8 kW of electric power to users for 4 hours.

In the YKESS described herein, a FESS that is far smaller (e.g., far less weight than 5 ton) can deliver the same 8 kW to users many times longer than 4 hours. That is accomplished by the YKESS as follows in paragraphs (i) to (v):

(i) A MSESS has its characteristic transition time. The transition time of a MSESS is defined as the time the MSESS takes to transition from its idle state to its full operational state. It is typically up to 30 minutes for a MSESS that generates electricity with a turbine that is driven with hot and high-pressure air. For concreteness, it is assumed that the transition time of the MSESS adopted in this example is 10 minutes, and it can generate 20 kW to be sent to users and/or the FESS when the MSESS is fully operational.

(ii) The transition time of the MSESS and its maximum electric power output determines the optimum (or recommended) energy storage capacity of the FESS in the YKESS described herein. The optimum (or recommended) energy storage capability of the FESS should be slightly greater than the electric energy that the MSESS can generate at its full electric power during a time span of its transition time. Therefore, in this case, the electric power output of the MSESS is approximately 3.34 kWh during a time span of 10 minutes (equal to its transition time of 10 minutes).

(iii) Therefore, the optimal (or recommended) energy storage of the FESS in the example YKESS is just 4 kWh (which is slightly larger than 3.34 kWh). The energy storage capacity of the FESS is much less than the energy storage of 32 kWh of the '5-ton' commercial FESS. If the MSESS can store 1000 kWh of energy in its hot molten salt, and the efficiency of the MSESS is 30%, 300 kWh of the energy stored in the MSESS can be supplied to the FESS for 37.5 hours at a rate of 8 kW.

(iv) A stand-alone FESS that can send 8 kW for 37.5 hours continuously to users must have an energy storage capacity of 300 kWh. The 5-ton commercial FESS has energy storage capacity of just 32 kWh. Therefore, one would need more than 9 units of the 5-ton FESS (9.375 units exactly) with 32 kWh of storage for continuous delivery of 8 kW for 37.5 hours. The 9.375 units of 5-ton FESS will weigh 47 tons. From these computations, it is clear that non-stop delivery of 8 kW to users with multiple units of FESS is simply economically not feasible. This is why many FESS are used for short-time delivery of large amount of electric power to users.

(v) There is another drastic difference between the commercial FESS and synergistic effects of the FESS and the MSESS in YKESS described herein. Since the FESS of YKESS may store just about 4 kWh of energy, it would weigh about 8 times less (32 kWh divided by 4 kWh) and its size will be significantly smaller than the commercial stand-alone FESS. The amount of energy the flywheel can store is linearly proportional to its weight. This means that the FESS with 4 kWh of capacity used in this invention would weigh only about 625 kg (5000 kg divided by 8), and its size should be significantly smaller than the 5-ton FESS. Obviously, the price of the FESS of YKESS would be significantly lower than price of the example 5-ton commercial FESS.

As shown in the above series of computations, the novel integration of FESS and MSESS brings in great benefits to the users of YKESS. The positive synergistic effects of the integration of FESS and MSES is not obvious at all. One must look at the two totally different energy storage systems critically and must make careful analysis of the synergistic effects as described herein. This is why no one has ever conceived of the integration of FESS and MSESS so far (to the best knowledge of the inventors).

There is another important benefit of the synergistic integration of FESS and MSESS. A single large MSESS can supply its electricity to multiple units of FESS to many users. A large MSESS with a huge energy storage capacity is very slow when it comes to changing its electric output. In other words, its transition time is slow. It is in the range of 30 minutes to 3 hours. If the MSESS (solely) supplies its electricity directly to its users, it cannot change its output (power sent to the users) fast enough in case power needs of its users change abruptly and unpredictably. The synergistic integration of FESS and MSESS of YKESS can solve this problem nicely as follows. The MSESS with its large energy storage capacity generates electricity and sends it to users and to many separately operating units of FESS. Each of the FESS will have a small energy storage capacity. When multiple units of FESS receive electricity from a single MSESS, each of the FESS may have its own energy storage capacity that can be enough for the FESS to send 10 kW or 20 kW to its users for about 10 minutes or so. Since the large MSESS supplies its electricity to many units of FESS, the MSESS will run continuously. Therefore, each of the multiple units of FESS can 'draw' electricity from the MSESS to replenish depleting energy levels for continuous delivery of electricity to users. Very importantly, each of the FESS supported by the large MSESS advantageously has small energy storage capacity (e.g., for the reasons described above).

The raw materials used to manufacture the YKESS described herein are environmentally friendly and abundant materials. Most materials that will be used for manufacturing of the YKESS described herein will be non-toxic to humans and to flora and fauna around its site. The service life of the FESS will be more than 20 years without any maintenance and repairs. The service life of the MSESS will be well over 20 years provided that turbine, compressor, pumps, and other electrical and mechanical components of the MSESS are properly maintained and quickly repaired when needed.

The MSESS in the YKESS described herein is essentially a large energy reservoir that supplies its energy to one or more FESS that can deliver electric power fast and for a long time. However, the MSESS is not the only option for its role in the YKESS. Any system capable of storing a large amount of energy as heat energy (e.g., hot sands, hot gravels, or hot oil), and mechanical energy of compressed air can be adopted to YKESS as a large reservoir of energy to supply the FESS. However, MSESS is a preferred energy reservoir of YKESS since it is cheap for construction, it occupies relatively small and compact space, and it can be installed at almost at any place (e.g., on a flat roof of a large building, or underground in the backyard of a house).

Figure 1:
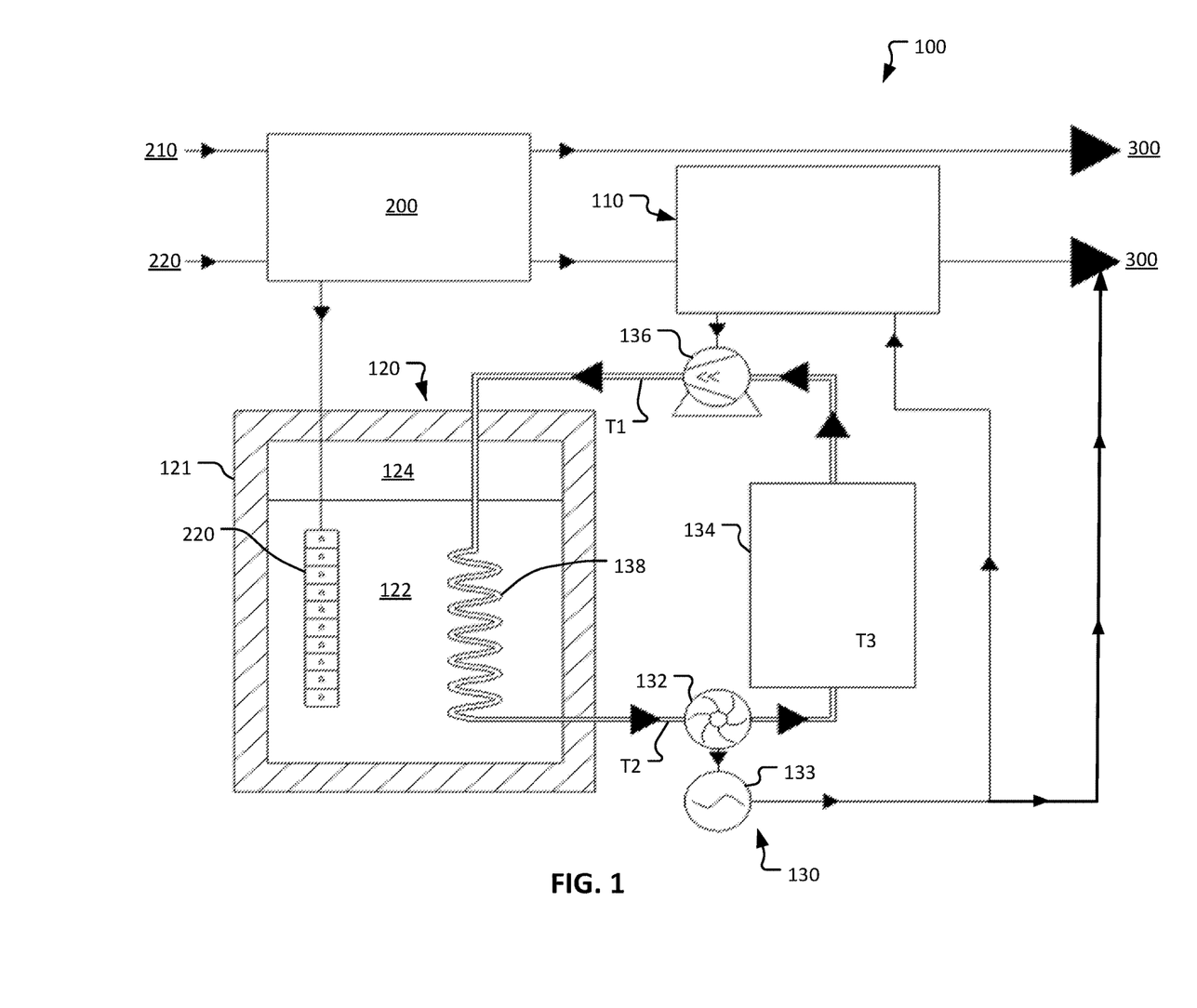
FIG. 1 is a schematic diagram illustrating an example YKESS that integrates FESS and MSESS in accordance with some embodiments described herein.

FIG. 1 is a schematic diagram of an example YKESS 100 in accordance with some embodiments. Arrowheads on single solid lines indicate the flow of electric power from one unit to another of the YKESS 100. Arrowheads on double solid lines indicate the flow of a fluid (e.g., air, steam, etc.) as a working fluid of the YKESS 100.

The YKESS 100 is used to store energy that is produced by one or more energy generation sources. For example, in FIG. 1, the YKESS 100 is used in conjunction with a renewable energy source 200 (which can be solar panels 210 and/or wind turbines 220, for example).

The YKESS 100 includes one or more FESS 110 (a single FESS 110 is depicted here, but multiple FESS 110 can be included in some embodiments) and a MSESS 120. The FESS 110, as a part of the YKESS 100, functions to provide instantaneous delivery large amounts of electricity to the users 300. The MSESS 120, as a part of the YKESS 100, functions to provide low-cost storage of large amounts of renewable energy in the form of heat (of molten salt), to convert the heat into electricity, and to send the electricity to users 300 and/or to the FESS 110 (e.g., when energy stored in the FESS 110 depletes below a certain level). Once the MSESS 120 is operating at or near 100% capacity, the MSESS 120 can supply electricity directly to end users 300 to cover the bulk of the demand from the users 300, while the FESS 110 can be used to provide just enough electricity to meet power demand surges/wrinkles and to ensure synchronization. The split between providing energy from the MSESS 120 to the users 300 and to keep the FESS 110 fully charged requires a control system that is not depicted in FIG. 1.

As depicted, at least a first portion of the energy generated by the renewable energy source 200 can be sent to users 300 without powering the one or more FESS 110. Alternatively, or additionally, at least a second portion of the energy generated from the renewable energy source 200 can be sent to and stored in the FESS 110 and/or the MSESS 120.

Energy received by the FESS 110 (from the renewable energy source 200 and/or the MSESS 120) is used to drive one or more flywheels that are used to generate electricity to be sent to users 300, and/or that are used to power a compressor or pump 136 of the MSESS 120. Energy received by the MSESS 120 (from the renewable energy source 200) is used to power a heater 220 that heats salt 122 (e.g., molten salt) within a container 121 of the MSESS 120. In these ways, excess electrical power from the renewable energy source 200 can be stored in the FESS 110 and/or the MSESS 120.

In the YKESS 100 described herein, the FESS 110 can provide electricity to users 300 on a fast basis in response to interruptions of power from the renewable energy source 200. The FESS 110 can generate electricity quickly. In some cases, the response time of the FESS 110 is typically less than one second with high degree of efficiency. The FESS 110 can drive one or more generators to create electricity that is sent to users 300 when power from the renewable energy source 200 is interpreted or diminished by day-and-night cycles or by unpredictable weather.

In the YKESS 100 described herein, the MSESS 120 works as an economical and high-capacity energy storage system that outputs electricity to power the FESS 110 and/or to be delivered directly to users 300. Molten salt 122 in MSESS 120 can store a large amount of energy at a low cost. Examples of how the YKESS 100 works:

Assuming the FESS 110 has energy storage capacity available (i.e., the FESS 110 is/are not fully "charged"), electrical power from the renewable energy source 200 is sent to the FESS 110 when there is an excessive leftover amount of electricity after the electricity is sent to meet the demand of the users 300 at any given moment of a day. The power sent to the FESS 110 drives the high-speed rotations of the one or more flywheels of the FESS 110. Accordingly, electricity from the renewable energy source 200 is stored by the FESS 110.

Additionally, some of the excessive leftover amount of electricity from the renewable energy source 200 is sent directly to the heater 220 of the MSESS 120 to heat its molten salt 122 (e.g., whenever it is necessary to prevent the temperature of the molten salt 122 from cooling down below a predetermined or desired temperature of the molten salt 122). In some embodiments, in addition to the salt 122 in the container 121, there is an inert gas 124 such as nitrogen or carbon dioxide in the container 121

The energy storage capacity of the FESS 110 is usually quite a lot smaller than the energy storage capacity of the MSESS 120. In part, this tends to be the case since the cost of energy storage in the FESS 110 is significantly higher than the cost of energy storage in the MSESS 120. Therefore, the energy storage capacity of the MSESS 120 is much larger than the energy storage capacity of the FESS 110 in the YKESS 100.

When the energy-storing capacity of the FESS 110 is fully loaded, the YKESS 100 can automatically divert the remaining leftover amount of electricity from the renewable energy source 200 to the MSESS 120 (which can store a lot more energy than the FESS 110). In addition, the MSESS 120 receives electricity from the renewable energy source 200 when the temperature of its molten salt 122 goes below a certain pre-determined lower threshold value.

The MSESS 120 stores energy as follows. The MSESS 120 receives electricity directly from the renewable energy source 200. The MSESS 120 converts the electricity into heat energy in its molten salt 122 using the Ohmic heater 220 that is in thermal contact the salt 122 of the MSESS 120. In this way, the temperature of the molten salt 122 is maintained at or above a desired value. The molten salt 122 is contained in the container 121 (e.g., tank, vessel, etc.). The container 121 is well insulated against heat loss. Very good heat insulation can be achieved cost effectively by wrapping up the container 121 with a low cost and lightweight insulating materials such as fiberglass, polyurethane foam, or more expensive materials such as aerogel and Pyrogel™.

In the YKESS 100 described herein, excellent heat insulation of the container 121 is beneficial since the MSESS 120 is used to store large amounts of heat energy for several weeks, or even for a few months. In one example, a targeted degree of thermal insulation of the container 121 is used to achieve a cooling rate of 10 C to 30 C (centigrade) or less per week, when temperature of the molten salt is in the range of 500 C to 900 C. The energy retention capabilities of the MSESS 120 will depend on factors such as the actual volume and surface area of the container 121 of molten salt 122, and the degree of heat insulation of insulating materials that wrap around the container 121. A thermally well-insulated MSESS 120 having a very large energy storage capacity as a source of electrical energy generation (for long-term delivery of electricity to users 300 in case of longtime interruptions of electricity generation from the renewable energy source 200) to power the FESS 110 is a novel feature of the YKESS 100 described herein.

The depicted MSESS 120 converts its heat energy into electricity as follows. As shown in FIG. 1, the MSESS 120 has its own compressed-air-driven-turbine (CADT) system 130. Accordingly, the CADT system 130 can be considered as a subsystem of the MSESS 120. The depicted CADT system 130 includes a turbine 132, a generator 133, an air storage tank 134, a compressor pump 136, and a heat exchanger 138.

A working fluid (e.g., air or steam; air is used in this example) in the piping of the CADT system 130 is compressed by the compressor pump 136 (which is powered by the FESS 110) to push the air into the heat exchanger 138 (e.g., one or more heat exchanging pipes or tubing) that is in contact with (e.g., immersed) in the molten salt 122 of the MSESS 120. As the air goes through the heat exchanger 138 (usually made of stainless steel), the air is heated by heat stored in the molten salt 122 to a high temperature and raised to a high pressure. This superheated air (air with high temperature and high pressure) is then sent to the turbine 132 of the CADT system 130. The turbine 132 drives the generator 133 to create electricity that is transmitted to the FESS 110 (to drive rotations of one or more flywheels of the FESS 110). As the hot air drives the turbine 132, the air expands and cools. If the air has a negligible amount of moisture, or has no moisture at all, it can be considered as an ideal gas in the temperature in range of 500 C to 900 C. If the air contains a non-negligible amount of moisture, the air may not be considered as an ideal gas, and efficiency of the CADT system 130 will be lower than the efficiency of the CADT system 130 with dry air. Therefore, for the YKESS 100 described herein, it is advantageous for the air in the CADT system 130 to be dry air, or to have a low level of moisture.

In some embodiments, after the air in the CADT system 130 is discharged from the turbine 132 the air is passed through an array of underground pipes to cool the air before its next use in the generator cycle. It is important that the air be dry to prevent condensation during this cooling step.

Since the air in the CADT system 130 can be considered an ideal gas as described above, the total energy contained in a unit mass of the air is proportional to its temperature (absolute temperature). Let T1 be the temperature of the air before it enters the heat exchanger 138 in the MSESS 120. Let T2 be the temperature of the air as it expands and drives the turbine 132. Clearly, a higher value of T2 and a lower value of T1 will result in higher efficiency of the CADT system 130. Accordingly, the rate of energy delivered by the air to the turbine 132 is proportional to (T2−T1) multiplied by flow rate of the air (e.g., the mass of the air that goes to the turbine blades per unit time), since the viscosity loss of the air is negligible as an ideal gas. A modern air compressor (such as the compressor pump 136) is highly efficient (e.g., 95% or higher). If we were to assume the power to drive the compressor pump 136 comes from the generator 133 of the CADT system 130 (contrary to the design of the YKESS 100), the total efficiency of the CADT system 130 would be about 70%.

However, in the YKESS 100 described herein, the energy used to run the air compressor pump 136 of the CADT system 130 will be typically supplied by electricity (or by direct mechanical power transmission) from the FESS 110, not by the electricity generated from the CADT system 130 in conjunction with the MSESS 120. This is very beneficial because the efficiency of the MSESS 120 is about 70%, while efficiency of the FESS 110 is about 95% (or even higher than 95%). For example, suppose the MSESS 120 must use 100 watts of power to run the compressor pump 136 of the CADT system 130. In that case, the MSESS 120 in conjunction with the turbine 132 and the generator 133 must produce about 143 watts of power to deliver the 100 watts to run the compressor pump 136. This is because the efficiency of the MSESS 120 is about 70%. However, the FESS 110 can deliver the same power of 100 watts to the compressor pump 136 by consuming about 105 watts (to produce the 100 watts). There is a difference of about 38 watts (143 watts minus 105 watts) between the MSESS 120 and the FESS 110 when each of the two forms of ESS delivers 100 watts to the compressor pump 136 independently. In other words, powering the air compressor pump 136 of the CADT system 130 using energy from the FESS 110 is much more efficient than by using energy from the MSESS 120.

Using the YKESS 100 described herein, the MSESS 120 does not need to power the air compressor pump 136 of the CADT system 130 (although it can in some cases). Instead, the MSESS 120 gets the compressed air without spending its own energy, since it is the FESS 110 that provides the energy to compress the air. This means that MSESS 120 can generate electricity (via the turbine 132 and the generator 133) with significantly higher efficiency when the air compressor pump 136 is powered by the FESS 110. This is a novel unique feature of the YKESS 100 described herein.

After leaving the turbine 132, the now colder air enters the storage tank 134 before it goes back to the air compressor pump 136 of the CADT system 130. In some embodiments, the temperature (T3) of the air in the storage tank 134 will be essentially at ambient temperature. When the air is compressed by the air compressor pump 136 of the CADT system 130 (before it enters the heat exchanger 138 in the MSESS 120), the air is thereby heated to the new temperature of T1 (as described above). However, the work to raise the air temperature from T3 to T1 is done by FESS 110, not by the MSESS 120. Therefore, the theoretical efficiency of the CADT system 130 will be (T2−T3)/T2 rather than (T2−T1)/T2. Since T3 is lower than T1, the theoretical efficiency of the MSESS 120 without spending its own energy to run the air compressor pump 136 is significantly higher than its theoretical efficiency with spending its own energy to run the air compressor pump 136. Since the dry air used in CADT system 130 can be considered as an ideal gas, the actual efficiency of the MSESS 120 will be nearly equal to its theoretical value. In this way, the MSESS 120 can generate its electricity with significantly higher efficiency than a conventional stand-alone MSES can generate.

In some cases, such as when an interruption of electricity generation by the renewable energy source 200 continues for many days and the energy storage of the FESS 110 becomes very low, the air compressor pump 136 will automatically switch from being powered by the FESS 110 to being powered by electricity generated by the MSESS 120 and the CADT system 130 (from the generator 133). This will usually be a rare event in the real world. In conventional MSESS, the energy for its air compressor pump is often supplied by an outside source such as an independent electric generator powered by burning fossil fuel. This runs contrary to the purpose of environmentally friendly renewable energy from the sunlight or wind. This is another benefit of the YKESS 100 described herein.

The generation of electricity by the renewable energy source 200 tends to fluctuate almost constantly due changing weather and day-and-night cycles. An interruption of the electricity generated by the renewable energy source 200 may last for minutes, a few hours, a few days, or a few weeks. In this embodiment of the YKESS 100, the FESS 110 alone stores enough energy for a few hours of supply of electricity to the user 300, and the MSESS 120 is used to store enough energy to supply electricity to drive the flywheel(s) of the FESS 110, and/or to supply the users 300, for several days or even for a few weeks. Accordingly, the YKESS 100 can provide electricity to users 300 from the FESS 110 (when powered by the MSESS 120) and/or from the MSESS 120 for several days or even for a few weeks when there are such interruptions in the generation of electricity by the renewable energy source 200.

It should be noted that the YKESS 100 described herein is not limited by exact values of efficiency of the FESS 110 or the MSESS 120 (e.g., as described above) since exact values of efficiency of the FESS 110 and the MSESS 120 will depend on details of designs and work conditions of the FESS 110 and the MSESS 120, and/or because it is almost impossible to measure exact values of efficiency of the FESS 110 and the MSESS 120. However, the efficiency numbers mentioned in this document are reasonably estimated numbers. The novel features of the YKESS 100 described herein are independent of exact values of efficiency of the FESS 110 and the MSESS 120, and material properties mentioned in this document.

The description of the YKESS 100 described herein is provided in the context of a solar or wind power plant. However, the energy from other energy sources can be stored in the same type or similar types of integrated YKESS 100, as described herein. In the YKESS 100 described herein, the MSESS 120 may be replaced with large-scale compressed air storage (CAES) if it is more cost effective for the same role of the MSESS 120.

Figure 2:
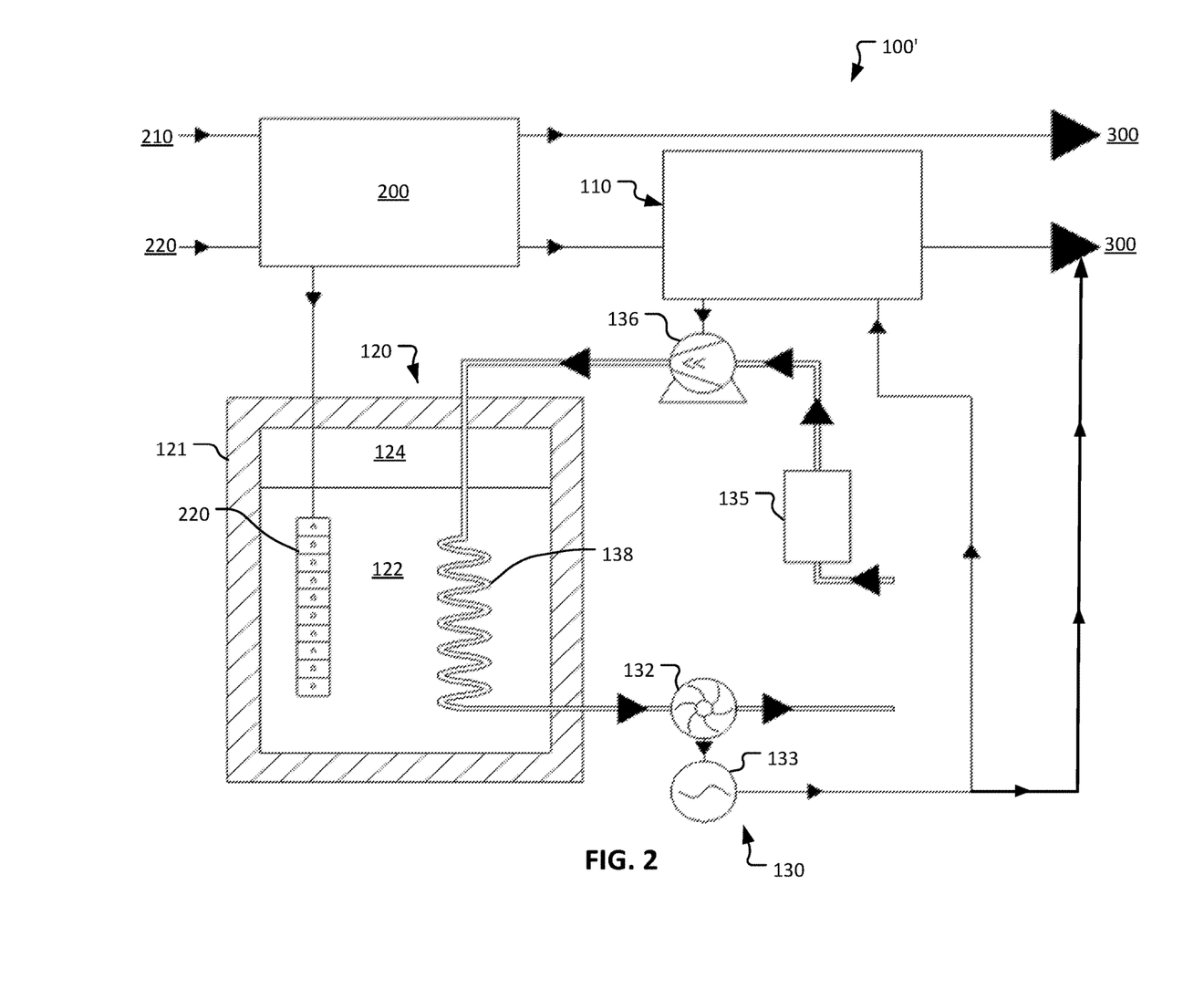
FIG. 2 is a schematic diagram illustrating another example YKESS that integrates FESS and MSESS in accordance with some embodiments described herein.

FIG. 2 is a schematic diagram of another example embodiment of YKESS 100'. In this version, ambient air is sucked into a filter and dehumidifier 135, compressed in the compressor or pump 136, heated in the heat exchanger 138, and then discarded into open ambient air after it passes the turbine 132 where it releases its energy to power the generator 133. Again, electricity output from the generator 133 is sent to the one or more FESS 110 to drive the rotations of the one or more flywheels of the FESS 110. The one or more FESS 110, in turn, generate electricity that is sent to the users 300 and generate power that is used to drive the compressor or pump 136. As in the case of YKESS 100, energy from the generator 133 can be fed to the FESS 110 (to increase the kinetic energy of the FESS 110) and/or to the users 300.

Figure 3:
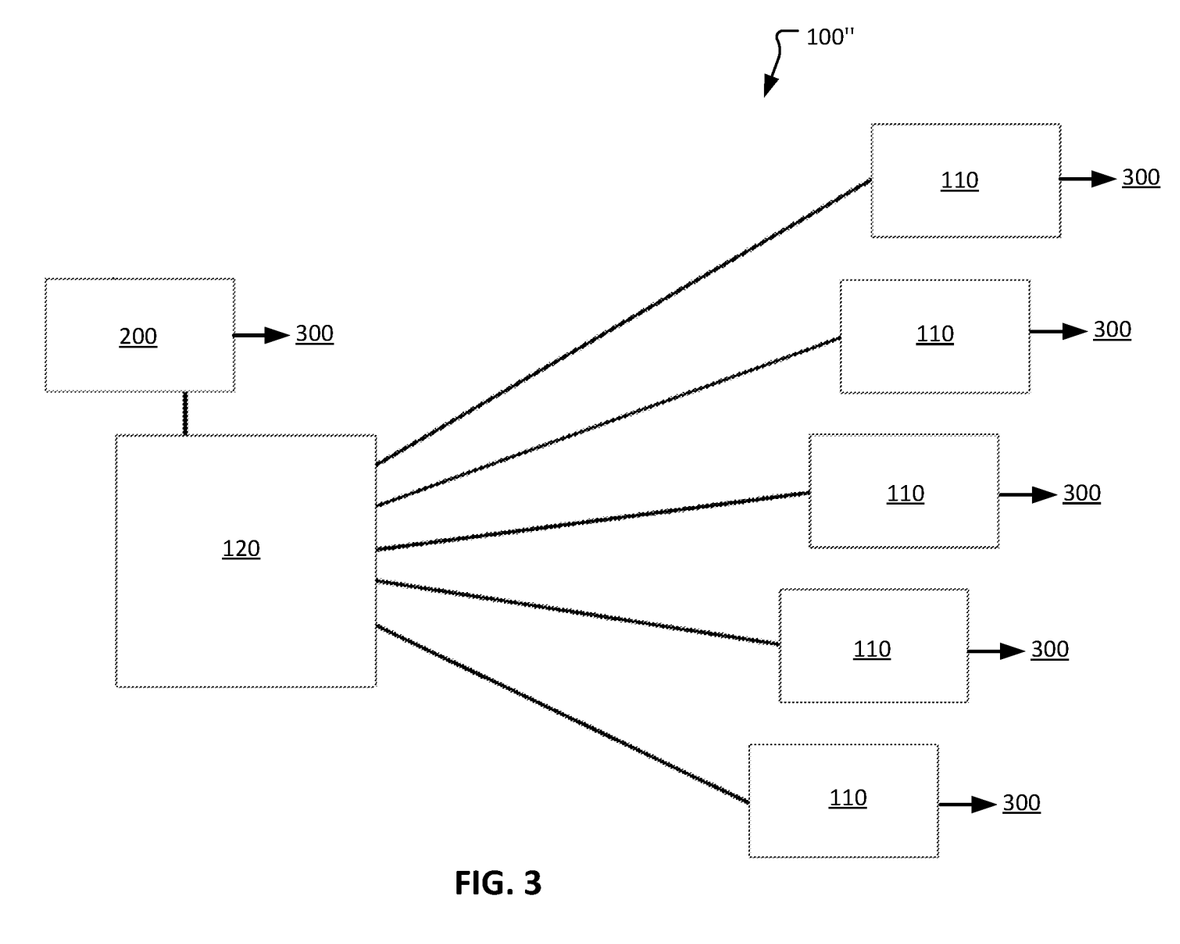
FIG. 3 is a schematic diagram of another example YKESS in which many small low-cost units of FESS are connected to a single MSESS having a large energy storage capacity.

FIG. 3 is a block diagram that illustrates that a large scale YKESS 100" can include a MSESS 120 that is operatively connected to a plurality of FESSs 110 in the same manner as described elsewhere herein (e.g., where electricity generated by the MSESS 120 is used to power rotations of the flywheels of the FESSs 110, and power from the FESSs 110 drives a pump or compressor of the MSESS 120). The multiple units of FESS 110 are connected to provide electricity to end users 300 of electricity or power grids 300. While not shown for simplicity sake, the electricity generated by the renewable energy source 200 can also be delivered directly to each FESS 110 of the plurality of FESSs 110 to power rotations of the flywheels of the FESSs 110. Also, for simplicity, the figure does not show the MSESS powering the users 300 directly.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described herein as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various modules and components in the embodiments described herein should not be understood as requiring such separation in all embodiments, and it should be understood that the described components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An energy storage and delivery system comprising:
   one or more flywheel energy storage systems (FESS), the one or more FESS including or coupled to one or more generators configured to generate and deliver electricity to users; and
   a molten salt energy storage system (MSESS) comprising:
     a container holding salt therein;
     a heater in thermal contact with the salt such that the salt is heated in response to the heater receiving energy from an energy source; and
     a heat exchanger in thermal contact with the salt;
   a turbine fluidly coupled to an output of the heat exchanger;
   an electricity generator mechanically coupled to the turbine, wherein electricity output by the electricity generator is delivered to the one or more FESS to power flywheel rotations of the one or more FESS; and
   a compressor or pump fluidly coupled to an input of the heat exchanger, wherein the compressor or pump is powered by energy output by the one or more FESS.

2. The system of claim 1, wherein the heater is configured to be electrically powered by electricity generated by solar panels or wind turbines.

3. The system of claim 2, wherein the system further comprises the solar panels or the wind turbines.

4. The system of claim 3, wherein the system is configured to send at least a first portion of the electricity generated by the solar panels or the wind turbines to users.

5. The system of claim 4, wherein system is configured to send at least a second portion the electricity generated by the solar panels or the wind turbines to the one or more FESS to power flywheel rotations of the one or more FESS.

6. The system of claim 1, wherein the heater is configured to transfer heat to the salt.

7. The system of claim 1, wherein the heat exchanger is configured to transfer heat from the salt to a fluid passing through the heat exchanger as the fluid flows toward the turbine.

8. The system of claim 1, further comprising a fluid storage tank positioned fluidly between an output of the turbine and an input of the compressor or pump.

9. The system of claim 8, wherein the fluid storage tank is underground.

10. The system of claim 1, wherein the system is configured to receive energy from a renewable energy source and to distribute the energy to: (i) the one or more FESS for storage of the energy delivered thereto, and (ii) the MSESS system for storage of the energy delivered thereto, and
    wherein the MSESS has an energy storage capacity that is at least two times more than the one or more FESS.

11. The system of claim 1, wherein the MSESS is also configured to deliver energy to power the compressor or pump.

12. The system of claim 11, wherein the system includes a control system that is configured to automatically switch the energy to power the compressor or pump from being delivered by the one or more FESS to being delivered by the MSESS in response to the energy contained by the one or more FESS reaching a lower limit.

13. The system of claim 1, wherein the electricity output by the electricity generator is also delivered to the users.

14. The system of claim 1, wherein each FESS of the one or more FESS has a kinetic energy storage capacity that can generate 10 kWh or less of electricity.

15. The system of claim 1, wherein each FESS of the one or more FESS weighs less than 1,000 kg.

16. The system of claim 1, wherein the one or more FESS comprises at least four FESS.

17. A method of delivering electricity to users, the method comprising:
   delivering a first amount of energy generated by a renewable energy source to the users as a first amount of electricity;
   delivering a second amount of the energy generated by the renewable energy source to one or more flywheel energy storage systems (FESS);
   storing, by the one or more FESS, the second amount of the energy as kinetic energy;
   delivering a third amount of the energy generated by the renewable energy source to a molten salt energy storage system (MSESS);
   storing, by the MSESS, the third amount of the energy as heat energy;
   generating a second amount of electricity using the heat energy stored by the MSESS; and
   delivering, to the users, the second amount of electricity that was generated using the heat energy stored by the MSESS.

18. The method of claim 17, wherein the electricity generated using the heat energy stored by the MSESS is delivered to the one or more FESS in response to a kinetic energy level of the one or more FESS being below a pre-determined lower threshold value.

19. The method of claim 17, further comprising powering, by energy delivered from the one or more FESS, a pump or compressor of the MSESS.

20. The method of claim 17, further comprising, in response to a demand for the electricity from the users being greater than the first amount of electricity generated by the renewable energy source, delivering additional electricity to the users, wherein the additional electricity is generated by the one or more FESS.

21. The method of claim 17, wherein the second amount of electricity is delivered to the users in response to a demand for the electricity from the users being greater than the first amount of electricity generated from the renewable energy source.

* * * * *